(12) United States Patent
Ishida

(10) Patent No.: US 9,948,223 B2
(45) Date of Patent: Apr. 17, 2018

(54) DRIVE UNIT OF SYNCHRONOUS MOTOR

(75) Inventor: Takashi Ishida, Tokyo (JP)

(73) Assignee: TOSHIBA MITSUBISHI-ELECTRIC INDUSTRIAL SYSTEMS CORPORATION, Tokyo (JP)

(*) Notice: Subject to any disclaimer, the term of this patent is extended or adjusted under 35 U.S.C. 154(b) by 0 days.

(21) Appl. No.: 14/420,948

(22) PCT Filed: Sep. 3, 2012

(86) PCT No.: PCT/JP2012/072368
§ 371 (c)(1),
(2), (4) Date: Feb. 11, 2015

(87) PCT Pub. No.: WO2014/033959
PCT Pub. Date: Mar. 6, 2014

(65) Prior Publication Data
US 2015/0222215 A1 Aug. 6, 2015

(51) Int. Cl.
*H02P 6/14* (2016.01)
*H02P 21/00* (2016.01)
(Continued)

(52) U.S. Cl.
CPC .......... *H02P 21/141* (2013.01); *H02P 21/10* (2013.01); *H02P 25/024* (2016.02)

(58) Field of Classification Search
CPC .......... H02P 21/00; H02P 21/18; B60K 6/26
(Continued)

(56) References Cited

U.S. PATENT DOCUMENTS 5,057,759 A * 10/1991 Ueda .................. H02P 21/13
318/561
6,359,415 B1 * 3/2002 Suzuki .................. H02P 21/00
318/700
(Continued)

FOREIGN PATENT DOCUMENTS

GB 2 347 283 A 8/2000
JP 09-182499 A 7/1997
(Continued)

OTHER PUBLICATIONS

International Preliminary Report on Patentability and Written Opinion dated Mar. 12, 2015 in PCT/JP2012/072368 (English translation only).

(Continued)

*Primary Examiner* — Eduardo Colon Santana
*Assistant Examiner* — Cortez Cook
(74) *Attorney, Agent, or Firm* — Oblon, McClelland, Maier & Neustadt, L.L.P.

(57) ABSTRACT

Provided is drive unit of a synchronous motor capable of improving the accuracy of magnetic flux operations with a simple configuration. To this end, the drive unit has a magnetic flux operation part which, in the case where a direction of a magnetic field pole of the synchronous motor is regarded as a d-axis and a direction orthogonal to the d-axis is regarded as a q-axis, calculates a magnetic flux of the d-axis and a magnetic flux of the q-axis on the basis of a current of the d-axis, a current of the q-axis, and a field current of the synchronous motor; and a magnetic flux operation error correcting part which calculates a phase difference between an input voltage and an input current of the synchronous motor and corrects an inner-phase difference angle calculated from the magnetic flux of the d-axis (Continued)

and the magnetic flux of the q-axis on the basis of the phase difference.

3 Claims, 5 Drawing Sheets

(51) Int. Cl.
| | | |
|---|---|---|
| *H02P 1/46* | (2006.01) | |
| *H02P 21/14* | (2016.01) | |
| *H02P 21/10* | (2016.01) | |
| *H02P 25/024* | (2016.01) | |

(58) Field of Classification Search
USPC .............................................. 318/400.02, 727
See application file for complete search history.

(56) References Cited

U.S. PATENT DOCUMENTS

| | | | |
|---|---|---|---|
| 2004/0113582 A1* | 6/2004 | Ide | ........................... H02P 21/18 318/717 |
| 2006/0125439 A1* | 6/2006 | Ajima | ....................... B60K 6/26 318/716 |
| 2007/0018606 A1* | 1/2007 | Iura | ..................... H02P 21/0042 318/807 |
| 2009/0026988 A1* | 1/2009 | Tomigashi | .............. H02P 21/10 318/400.02 |
| 2010/0066283 A1* | 3/2010 | Kitanaka | ............. B60L 11/1803 318/400.02 |
| 2011/0050137 A1* | 3/2011 | Imura | ................. H02P 21/0003 318/400.15 |

FOREIGN PATENT DOCUMENTS

| | | |
|---|---|---|
| JP | 09-327200 A | 12/1997 |
| JP | 10-286000 A | 10/1998 |
| JP | 2002238278 A * | 8/2002 |
| WO | WO 00/27024 A1 | 5/2000 |

OTHER PUBLICATIONS

International Search Report dated Dec. 4, 2012 in PCT/JP2012/072368 Filed Sep. 3, 2012.

Korean Office Action dated Jun. 17, 2016 in Patent Application No. 10-2015-7005933 (with partial English translation).

* cited by examiner (a) d-AXIS EQUIVALENT CIRCUIT (b) q-AXIS EQUIVALENT CIRCUIT

… (1)

DRIVE UNIT OF SYNCHRONOUS MOTOR

TECHNICAL FIELD

The present invention relates to a drive unit of a synchronous motor.

BACKGROUND ART

There have been proposed drive units of a synchronous motor in which operations of a magnetic flux of the synchronous motor are performed by defining the mutual inductance between a d-axis and a q-axis and mutual inductance between a field system and the q-axis of the synchronous motor. According to these drive units, it is possible to improve the accuracy of magnetic flux operations (refer to Patent Document 1, for example).

CITATION LIST

Patent Literature

Patent Literature 1: Japanese Patent Laid-Open No. 9-327200

SUMMARY OF INVENTION

Technical Problem

However, in the drive unit of a synchronous motor described in Patent Literature 1, magnetic flux operations become complex. Furthermore, it is necessary to carry out detailed magnetic flux analyses under various load conditions in order to grasp beforehand a mutual inductance between a d-axis and a q-axis and a mutual inductance between a magnetic flux and the q-axis.

The present invention aims to solve the above-described problem and the object thereof is to provide a drive unit of a synchronous motor capable of improving the accuracy of magnetic flux operations with a simple configuration.

Means for Solving the Problems

A drive unit of a synchronous motor of the present invention includes a magnetic flux operation part which, in the case where a direction of a magnetic field pole of the synchronous motor is regarded as a d-axis and a direction orthogonal to the d-axis is regarded as a q-axis, calculates a magnetic flux of the d-axis and a magnetic flux of the q-axis on the basis of a current of the d-axis, a current of the q-axis, and a field current of the synchronous motor; and a magnetic flux operation error correcting part which calculates a phase difference between an input voltage and an input current of the synchronous motor and corrects an inner-phase difference angle calculated from the magnetic flux of the d-axis and the magnetic flux of the q-axis on the basis of the phase difference.

Advantageous Effect of Invention

According to the present invention, it is possible to improve the accuracy of magnetic flux operations with a simple configuration.

DESCRIPTION OF EMBODIMENTS

Embodiments of the present invention will be described with reference to the accompanying drawings. In each of the drawings, identical numerals refer to identical or corresponding parts and overlaps of description of these parts are appropriately simplified or omitted.

Embodiment 1

Figure 1:
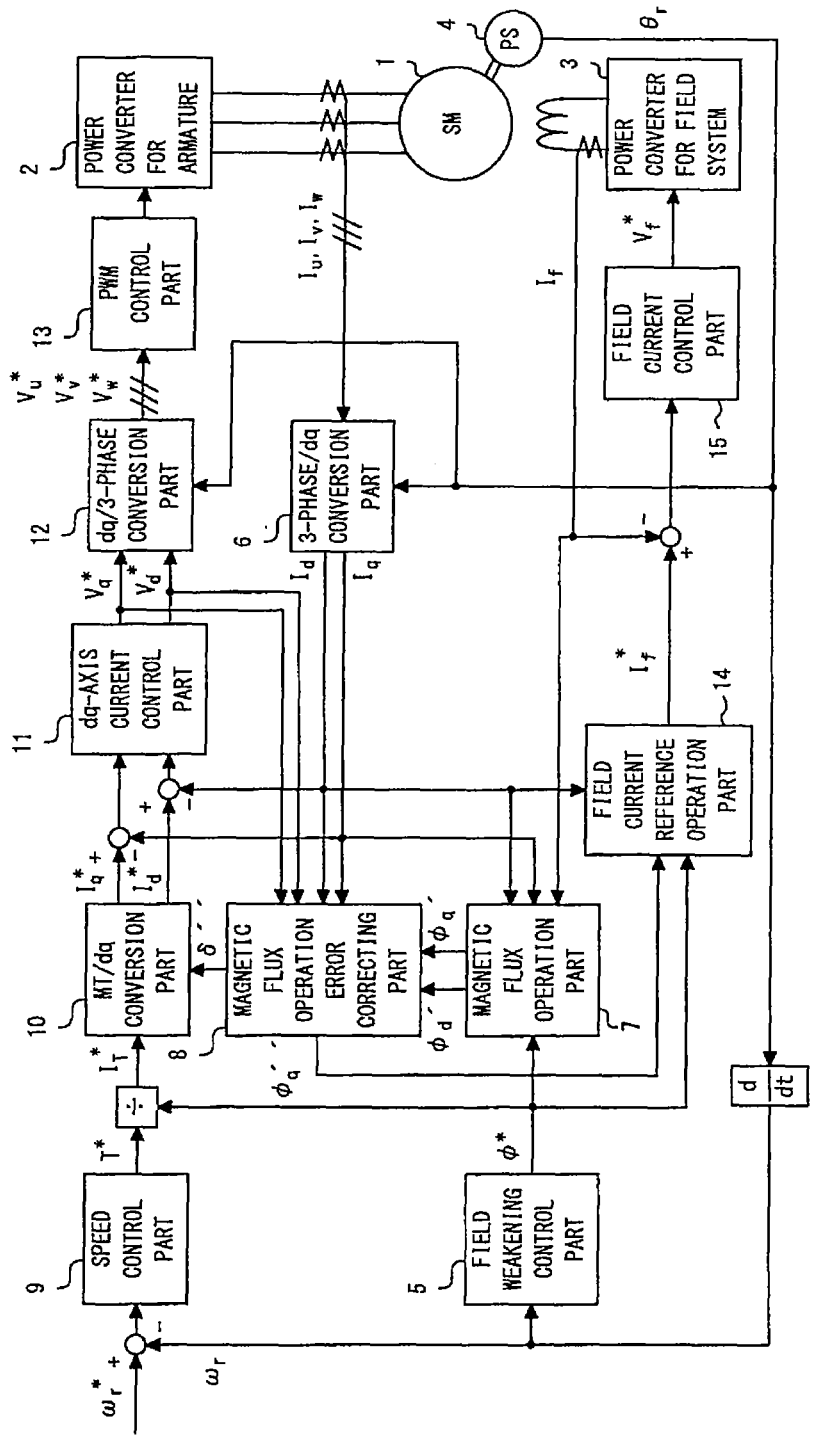
FIG. 1 is a block diagram of a drive unit of a synchronous motor in Embodiment 1 of the present invention.

FIG. 1 is a block diagram of a drive unit of a synchronous motor in Embodiment 1 of the present invention.

In FIG. 1, a synchronous motor 1 is used in order to drive rolls and the like of a rolling mill.

A power converter for armature 2 is connected to an armature of the synchronous motor 1. The power converter for armature 2 has the function of converting DC power to AC power and supplying the AC power to the armature of the synchronous motor 1. A power converter for field system 3 is connected to a field system of the synchronous motor 1. The power converter for field system 3 has the function of supplying power to a field system of the synchronous motor 1. A speed detector 4 is provided in the vicinity of the synchronous motor 1. The speed detector 4 has the function of detecting a position $\theta_r$ of a rotor of the synchronous motor 1.

The power converter for armature 2, the power converter for field system 3, and the speed detector 4 are connected to the drive unit.

The drive unit is provided with a field weakening control part 5, a 3-phase/dq conversion part 6, a magnetic flux operation part 7, a magnetic flux operation error correcting part 8, a speed control part 9, an MT/dq conversion part 10, a dq-axis current control part 11, a dq/3-phase conversion part 12, a PWM control part 13, a field current reference operation part 14, and a field current control part 15.

The field weakening control part 5 has the function of calculating a magnetic flux reference $\phi^*$ on the basis of an angular speed $\omega_r$ calculated from a change in the position $\theta_r$. The 3-phase/dq conversion part 6 has the function of calculating a d-axis armature current $I_d$ and a q-axis armature current $I_q$ on the basis of currents $I_u$, $I_v$, and $I_w$ which are inputted to each phase of the synchronous motor 1, and the position $\theta_r$.

The magnetic flux operation part 7 has the function of calculating a d-axis component estimate value $\phi_d{}'$ and a q-axis component estimate value $\phi_q{}'$ of the main flux on the basis of a d-axis armature current $I_d$, a q-axis armature current $I_q$, a magnetic field current $I_f$ inputted to a magnetic field of the synchronous motor 1, and the magnetic flux reference $\phi^*$.

The magnetic flux operation error correcting part 8 has the function of calculating an inner-phase difference angle estimate value $\delta'$ on the basis of the d-axis component estimate value $\phi_d{}'$ and the q-axis component estimate value $\phi_q{}'$ of the main magnetic flux. The magnetic flux operation error correcting part 8 has the function of calculating an inner-phase difference angle estimate value $\delta''$ by correcting the inner-phase difference angle estimate value $\delta'$. The magnetic flux operation error correcting part 8 has the function of calculating a q-axis component estimate value $\phi_q{}''$ by correcting the q-axis component estimate value $\phi_q{}'$.

The speed control part 9 has the function of calculating a torque reference $T^*$ of the synchronous motor 1 on the basis of a deviation of an angular speed $\omega_r$ from a speed reference $\omega_r{}^*$. The MT/dq conversion part 10 has the function of breaking down a torque current reference $I_T{}^*$ on a T-axis, which is obtained by dividing the torque reference $T^*$ by the magnetic flux reference $\phi^*$, into a d-axis armature current reference $I_d{}^*$ and a q-axis armature current reference $I_q{}^*$ through the use of the inner-phase difference angle estimate value $\delta''$.

The dq-axis current control part 11 has the function of calculating a d-axis armature voltage reference $V_d{}^*$ and a q-axis armature voltage reference $V_q{}^*$ so that a deviation of the d-axis armature current $I_d$ from the d-axis armature current reference $I_d{}^*$ and the deviation of a q-axis armature current $I_q$ from the q-axis armature current reference $I_q{}^*$ disappear. The dq/3-phase conversion part 12 has the function of calculating voltage references $V_u{}^*$, $V_v{}^*$, and $V_w{}^*$ supplied to the armature of the synchronous motor 1 on the basis of the d-axis armature voltage reference $V_d{}^*$, the q-axis armature voltage reference $V_q{}^*$, and the position $\theta_r$. The PWM control part 13 has the function of controlling the power converter for armature 2 on the basis of voltage references $V_u{}^*$, $V_v{}^*$, and $V_w{}^*$.

The field current reference operation part 14 has the function of calculating a magnetic field current reference $I_f{}^*$ on the basis of the magnetic flux reference $\phi^*$, the q-axis component estimate value $\phi_q{}''$ of the main magnetic flux, and the d-axis armature current $I_d$. The field current control part 15 has the function of calculating a field voltage reference $V_f{}^*$ so that a deviation of the field current $I_f$ from the field current reference $I_f{}^*$ disappears.

In the above-described drive unit, the magnetic flux operation error correcting part 8 uses the d-axis armature voltage reference $V_d{}^*$, the q-axis armature voltage reference $V_q{}^*$, the d-axis armature current $I_d$, and the q-axis armature current $I_q$ in calculating the inner-phase difference angle estimate value $\delta''$ by correcting the inner-phase difference angle estimate value $\delta'$. The magnetic flux operation error correcting part 8 uses the q-axis component estimate value $\phi_d{}'$ and the q-axis component estimate value $\phi_q{}'$ of the main magnetic flux, and the inner-phase difference angle estimate value $\delta''$ in calculating the q-axis component estimate value $\phi_q{}''$ by correcting the q-axis component estimate value $\phi_q{}'$ of the main magnetic flux.

Next, vector control of the synchronous motor 1 will be described with the aid of FIG. 2.

Figure 2:
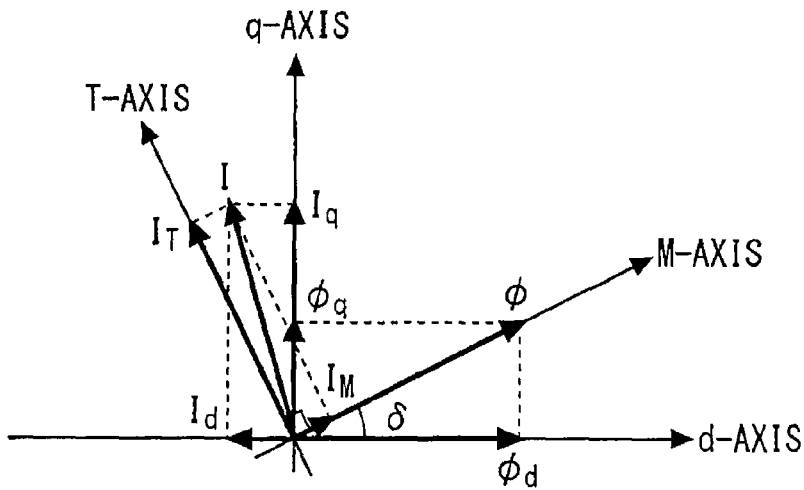
FIG. 2 is a diagram to explain vector control of the synchronous motor by the drive unit of the synchronous motor in Embodiment 1 of the present invention.

FIG. 2 is a diagram to explain vector control of the synchronous motor by the drive unit of the synchronous motor in Embodiment 1 of the present invention.

A d-axis (a direct axis) corresponds to the direction of a magnetic field pole of the synchronous motor 1. A q-axis (a quadrature axis) corresponds to a direction orthogonal to the d-axis. An M-axis corresponds to the direction of the main magnetic flux in which a magnetic flux by a field system and a magnetic flux by an armature current are combined. A T-axis corresponds to a direction orthogonal going straight to the M-axis. An inner-phase difference angle $\delta$ is an angle of the M-axis to the d-axis.

In vector control of the synchronous motor 1, the power factor becomes 1 by causing a torque current $I_T$ to flow in the T-axis direction on the basis of the size of the main magnetic flux $\phi$ and the inner-phase difference angle $\delta$.

Next, with the aid of FIG. 3, a description will be given of methods of calculating the d-axis component estimate value $\phi_d{}'$ and the q-axis component estimate value $\phi_q{}'$ of the main magnetic flux, the inner-phase difference angle estimate value $\delta'$, and the field current reference $I_f{}^*$.

Figure 3:
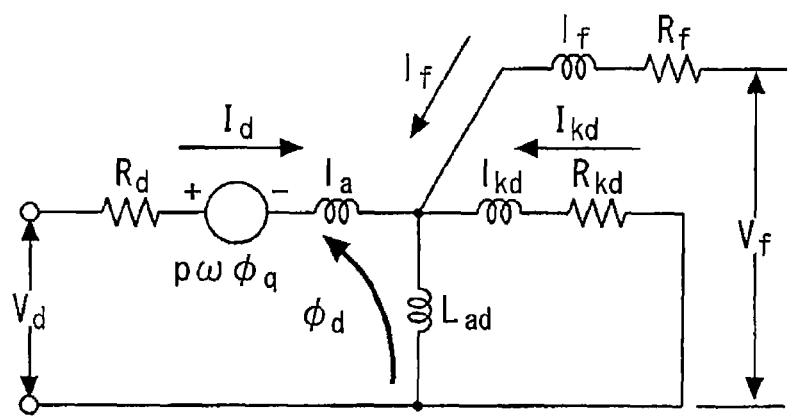
FIG. 3 is a diagram of a d-axis equivalent circuit and a q-axis equivalent circuit, respectively, of the synchronous motor driven by the drive unit of the synchronous motor in Embodiment 1 of the present invention.
Figure 3:
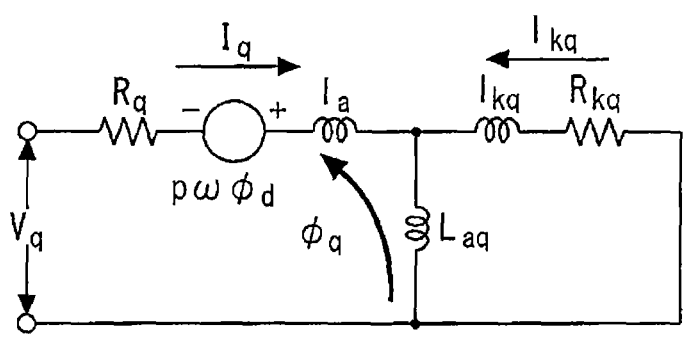

FIG. 3 is a diagram of a d-axis equivalent circuit and a q-axis equivalent circuit, respectively, of the synchronous motor driven by the drive unit of the synchronous motor in Embodiment 1 of the present invention.

FIG. 3 is a diagram of equivalent circuits of the synchronous motor 1 of the salient-pole type with damper-wound-rotor. Here, the parameters and currents have primary-side converted values.

In FIG. 3, $\phi_d$ is the d-axis component of the main magnetic flux. $\phi_q$ is the q-axis component of the main magnetic flux. $I_d$ is the d-axis armature current. $I_q$ is the q-axis armature current. $L_{ad}$ is a d-axis armature reaction inductance. $L_{aq}$ is a q-axis armature reaction inductance. $l_a$ is an armature leakage inductance. $I_f$ is a field current. $I_{kd}$ is a d-axis damper current. $I_4$, is a q-axis damper current. $R_{kd}$ is a d-axis damper resistor. $R_{kq}$ is a q-axis damper resistor. $l_{kd}$ is a d-axis damper leakage inductance. $l_{kg}$ is a q-axis damper leakage inductance.

In these equivalent circuits, the d-axis element $\phi_d$ and q-axis element $\phi_q$ of the main magnetic flux on the primary side are given by Expression (1) and Expression (2) below.

[Expression 1]

$$\phi_d = (L_{ad}+l_a)I_d + L_{ad}I_{kd} + L_{ad}I_f \tag{1}$$

[Expression 2]

$$\phi_q = (L_{aq}+l_a)I_q + L_{aq}I_{kq} \tag{2}$$

The damper current of the d-axis $I_{kd}$ and the damper current of the q-axis $I_{kq}$ are given by Expression (3) and Expression (4) below from Park's equation.

[Expression 3]

$$I_{kd} = -\frac{sL_{ad}}{R_{kd} + s(L_{ad}+l_{kd})} \cdot (I_d + I_f) \tag{3}$$

[Expression 4]

$$I_{kq} = -\frac{sL_{aq}}{R_{kq} + s(L_{aq}+l_{kq})} \cdot I_q \tag{4}$$

The d-axis component estimate value $\phi_d{}'$ of the main magnetic flux is calculated by Expression (5) below by substituting Expression (3) into Expression (1).

[Expression 5]

$$\phi'_d = L_{ad} \cdot \frac{R_{kd} + s l_{kd}}{R_{kd} + s(L_{ad} + l_{kd})} \cdot (I_d + I_f) + l_a I_d \qquad (5)$$

The q-axis component estimate value $\phi_q'$ of the main magnetic flux is calculated by Expression (6) below by substituting Expression (4) into Expression (2).

[Expression 6]

$$\phi'_q = L_{aq} \cdot \frac{R_{kq} + s l_{kq}}{R_{kq} + s(L_{aq} + l_{kq})} \cdot I_q + l_a I_q \qquad (6)$$

The d-axis armature reaction inductance $L_{ad}$ and the q-axis armature reaction inductance $L_{aq}$ change according to the size of a magnetic flux. That is, the d-axis armature reaction inductance $L_{ad}$ and the q-axis armature reaction inductance $L_{aq}$ have magnetic flux saturation characteristics. For this reason, the magnetic flux saturation characteristics of the d-axis armature reaction inductance $L_{ad}$ and the q-axis armature reaction inductance $L_{aq}$ are grasped beforehand by tests and electromagnetic field analyses.

On this occasion, the inner-phase difference angle estimate value $\delta'$ is calculated by Expression (7) below.

[Expression 7]

$$\delta' = \tan^{-1}\left(\frac{\phi'_q}{\phi'_d}\right) \qquad (7)$$

On the other hand, the field current reference $I_f^*$ is calculated so that the size of the main magnetic flux becomes equal to the magnetic flux reference $\phi^*$ by canceling the magnetization and demagnetization actions of the main magnetic flux by the armature reaction magnetic flux.

Specifically, $I_f$ is given by Expression (8) below by rearranging Expression (1), substituting Expression (3) and canceling $I_{kd}$.

[Expression 8]

$$I_f = \frac{\phi_d - (L_{ad} + l_a) I_d}{L_{ad}} \qquad (8)$$

On this occasion, in order that a combined magnetomotive force of the d-axis component $\phi_d$ and the q-axis component $\phi_q$ of the main magnetic flux becomes the magnetic flux reference $\phi^*$, $\phi_d$ is calculated by Expression (9) below.

[Expression 9]

$$\phi_d = \sqrt{\phi^{*2} - \phi_q^2} \qquad (9)$$

The field current reference $I_f^*$ is calculated by Expression (10) below by substituting Expression (9) into Expression (8). On this occasion, the q-axis component estimate value $\phi_q'$ is used in place of the q-axis component $\phi_q$ of the main magnetic flux.

[Expression 10]

$$I_f^* = \frac{\sqrt{\phi^{*2} - \phi_q'^2} - (L_{ad} + l_a) I_d}{L_{ad}} \qquad (10)$$

Next, with the aid of FIG. 4, a description will be given of the case where there is a deviation in the estimated magnetic flux direction of the synchronous motor 1.

Figure 4:
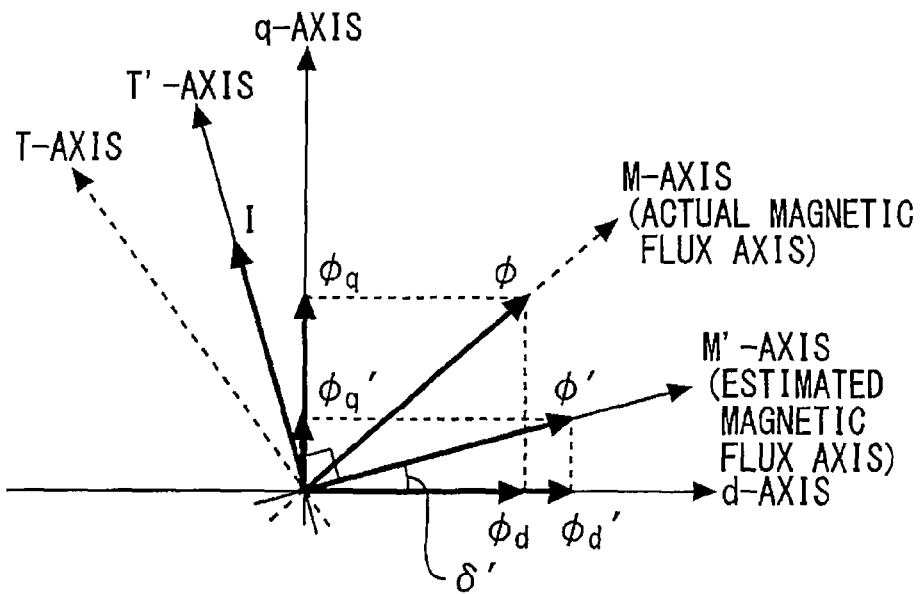
FIG. 4 is a diagram to explain the case where there is a deviation in the estimated magnetic flux direction of the synchronous motor 1 which is driven by the drive unit of the synchronous motor in Embodiment 1 of the present invention.

FIG. 4 is a diagram to explain the case where there is a deviation in the estimated magnetic flux direction of the synchronous motor 1 which is driven by the drive unit of the synchronous motor in Embodiment 1 of the present invention.

According to Expression (1) and Expression (5), the d-axis component $\phi_d$ and the d-axis component estimate value $\phi_d^*$ of the main magnetic flux become functions of the d-axis armature current $I_d$ and the field current $I_f$. According to Expression (2) and Expression (6), the q-axis component $\phi_q$ and the q-axis component estimate value $\phi_q^*$ of the main magnetic flux become a function of the q-axis armature current $I_q$.

However, in the synchronous motor 1 with heavy magnetic loading, when magnetic flux saturation increases in a high load condition, a magnetic coupling occurs between the d-axis and the q-axis and between a field system and the q-axis. In this case, the synchronous motor 1 has nonlinear magnetic flux saturation characteristics.

As a result of this, as shown in FIG. 4, a deviation occurs between the estimated magnetic flux direction (an M'-axis) and the actual magnetic flux direction (the M-axis). For example, the phase of an input current to the synchronous motor 1 delays. As a result of this, the accuracy of the power factor and torque of the synchronous motor 1 worsens.

Therefore, the drive unit of the synchronous motor 1 of Embodiment 1 acts in such a manner as to suppress a deviation between the estimated magnetic flux direction (the M'-axis) and the actual magnetic flux direction (the M-axis). The method to suppress the deviation between the estimated magnetic flux direction (the M'-axis) and the actual magnetic flux direction (the M-axis) will be described below.

Figure 5:
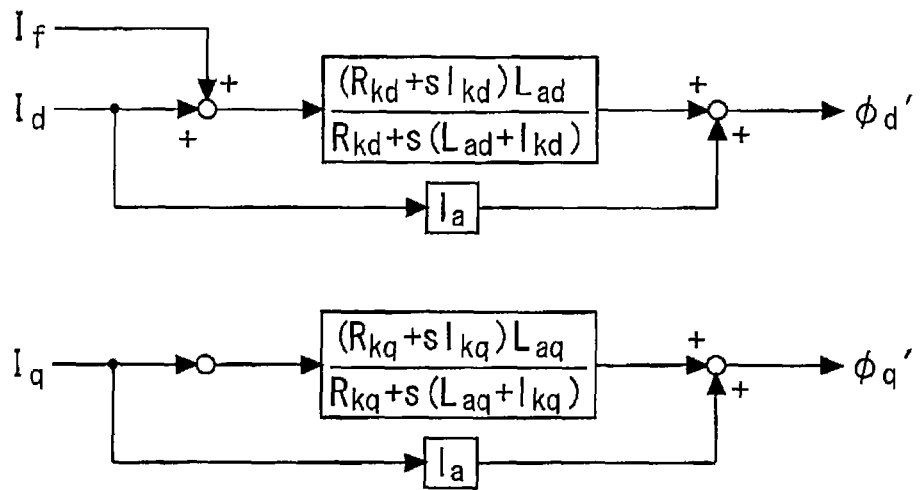
FIG. 5 is a block diagram of the magnetic flux operation part provided in the drive unit of the synchronous motor in Embodiment 1 of the present invention.

First, the magnetic flux operation part 7 will be described with the aid of FIG. 5. FIG. 5 is a block diagram of the magnetic flux operation part provided in the drive unit of the synchronous motor in Embodiment 1 of the present invention.

As shown in FIG. 5, the magnetic flux operation part 7 performs operations based on Expression (5) and Expression (6). That is, the magnetic flux operation part 7 performs operations of the d-axis composition estimate value $\phi_d'$ of the main magnetic flux on the basis of the d-axis armature current $I_d$ and the magnetic field current $I_f$. The magnetic flux operation part 7 calculates the q-axis composition estimate value $\phi_q'$ of the main magnetic flux on the basis of the q-axis armature current $I_q$.

Next, the magnetic flux operation error correcting part 8 will be described with the aid of FIG. 6.

Figure 6:
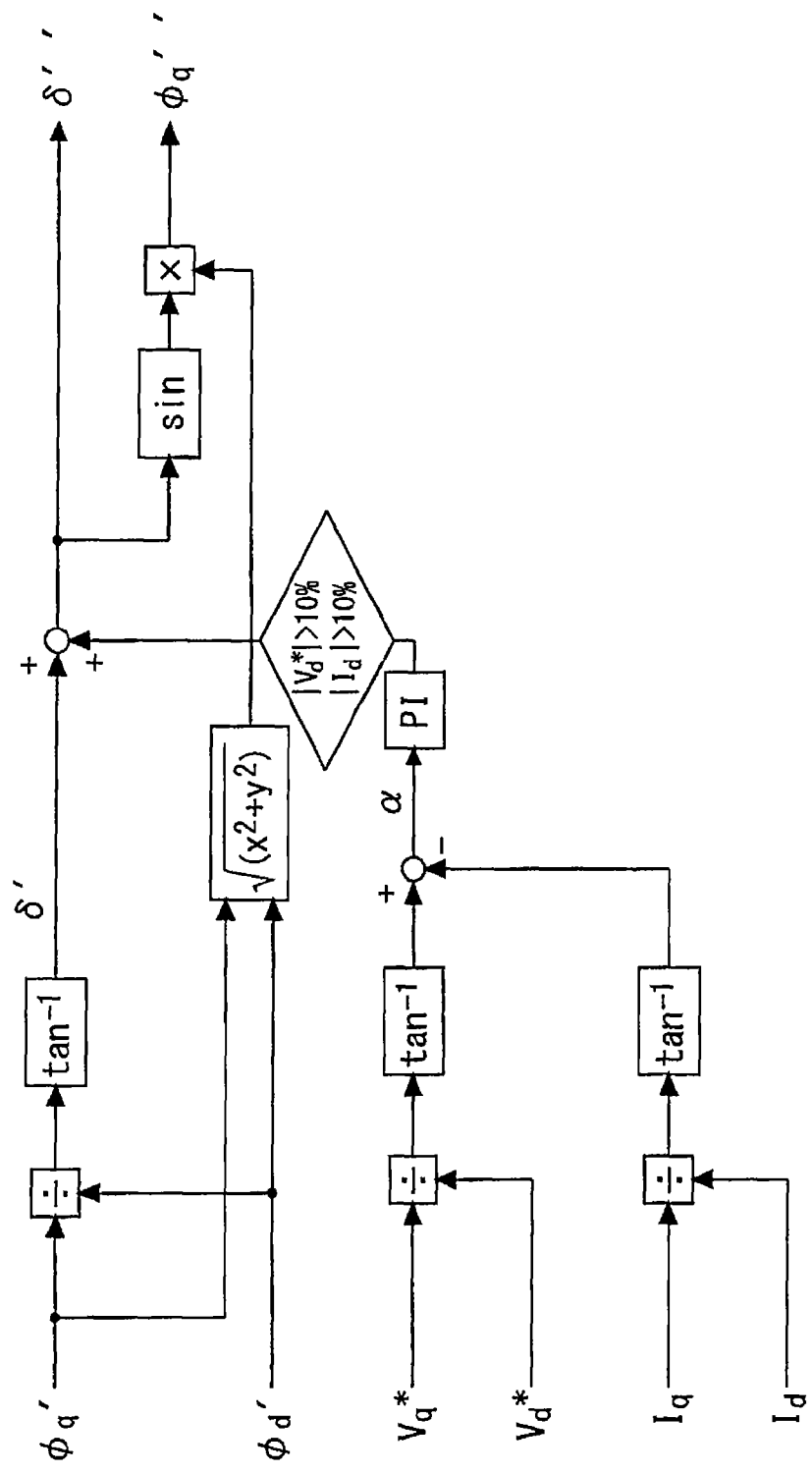
FIG. 6 is a block diagram of the magnetic flux operation error correcting part provided in the drive unit of the synchronous motor in Embodiment 1 of the present invention.

FIG. 6 is a block diagram of the magnetic flux operation error correcting part provided in the drive unit of the synchronous motor in Embodiment 1 of the present invention.

As shown in FIG. 6, the magnetic flux operation error correcting part 8 performs operations based on Expression (7). That is, the magnetic flux operation error correcting part 8 calculates the inner-phase difference angle estimate value $\delta'$ on the basis of the d-axis composition estimate value $\phi_d'$ and the q-axis composition estimate value $\phi_q'$ of the main magnetic flux.

The magnetic flux operation error correcting part 8 calculates a phase difference $\alpha$ between the input voltage reference to the synchronous motor 1 and the input current to the synchronous motor 1 on the basis of the d-axis armature voltage reference $V_d^*$, the q-axis armature voltage reference $V_q^*$, the d-axis armature current $I_d$, and the q-axis armature current $I_q$. Specifically, the phase difference $\alpha$ is calculated by Expression (11) below.

[Expression 11]

$$\alpha = \tan^{-1}\left(\frac{V_q^*}{V_d^*}\right) - \tan^{-1}\left(\frac{I_q}{I_d}\right) \quad (11)$$

In vector control of the synchronous motor 1, the power factor 1 becomes 1 when the armature current is caused to flow on the T-axis. Therefore, in the case where the power factor is not 1, the phase difference $\alpha$ occurs between the input voltage and input current of the synchronous motor 1. For example, when a deviation occurs between the estimated magnetic flux direction (the M'-axis) and the actual magnetic flux direction (the M-axis) as shown in FIG. 4, the phase difference $\alpha$ becomes larger than 0.

Therefore, the magnetic flux operation error correcting part 8 performs PI-control of the phase difference $\alpha$ and cancels the phase difference $\alpha$. That is, the magnetic flux operation error correcting part 8 calculates the inner-phase difference angle estimate value $\delta''$ by adding a value obtained by the PI-control of the phase difference $\alpha$ to the inner-phase difference angle estimate value $\delta'$.

The magnetic flux operation error correcting part 8 calculates the q-axis magnetic flux estimate value $\phi_q''$ by correcting the q-axis magnetic flux estimate value $\phi_q'$. Specifically, the q-axis magnetic flux estimate value $\phi_q''$ is calculated by Expression (12) below. On this occasion, operations are performed so that the size of the main magnetic flux becomes constant before and after a correction.

[Expression 12]

$$\phi_q'' = \sqrt{\phi_d'^2 + \phi_q'^2} \times \sin \delta'' \quad (12)$$

In Expression (11), at a very low speed of the synchronous motor 1, in a no-load condition, and the like, a calculated value of the phase difference $\alpha$ becomes inaccurate when the d-axis armature voltage reference $V_d^*$ and the d-axis armature current $I_d$ become close to 0. For this reason, a dead zone is provided for a compensation based on the phase difference $\alpha$. In FIG. 6, a compensation based on the phase difference $\alpha$ is provided in such a manner as to work when the d-axis armature voltage reference $V_d^*$ and the d-axis armature current $I_d$ become larger than 10% of ratings.

According to Embodiment 1 described above, the inner-phase difference angle is corrected on the basis of the phase difference $\alpha$. For this reason, it is possible to improve the accuracy of magnetic flux operations with a simple configuration. For this reason, it is possible to improve the power factor and torque control. As a result of this, it is possible to pursue reductions in size and weight and improvement of economic efficiency of the synchronous motor 1.

In magnetic flux operations of Embodiment 1, the effect of errors of motor constants is small. For this reason, it is possible to adjust parameters easily.

The d-axis armature voltage reference $V_d^*$ and the q-axis armature voltage reference $V_q^*$ are used as the input voltage to the synchronous motor 1. For this reason, it is possible to correct the inner-phase difference angle without using a device for detecting the input voltage to the synchronous motor 1.

The q-axis magnetic flux estimate value $\phi_q''$ is calculated by correcting the q-axis magnetic flux estimate value $\phi_q'$ on the basis of the corrected inner-phase difference angle estimate value $\delta''$. For this reason, it is possible to more accurately calculate the magnetic field current reference $I_f^*$.

As shown in Expression (13) below, the phase difference $\alpha$ may be calculated using an outer product.

[Expression 13]

$$\alpha = \sin^{-1}\left(\frac{\vec{I} \times \vec{V}^*}{|\vec{I}| \cdot |\vec{V}^*|}\right) = \sin^{-1}\left(\frac{I_d \cdot V_q - I_q \cdot V_d}{|\vec{I}| \cdot |\vec{V}^*|}\right) \quad (13)$$

Here, $\times$ is an outer product. $\vec{I}$ is an input current feedback vector of the synchronous motor 1. $\vec{V}$ is the input voltage reference vector of the synchronous motor 1.

In this case, it is not always necessary to provide a dead zone for a compensation based on the phase difference $\alpha$.

Embodiment 2

Figure 7:
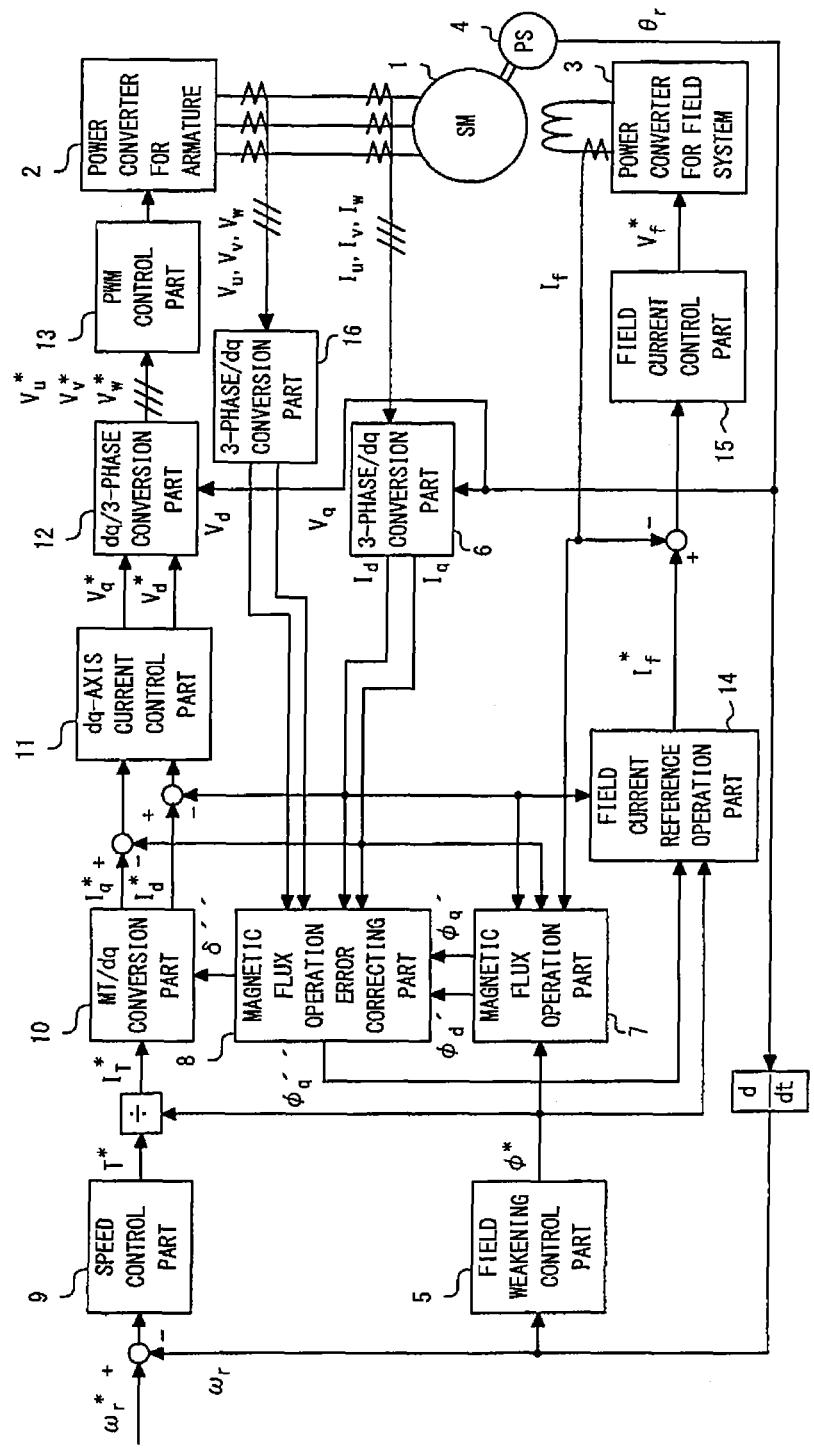
FIG. 7 is a block diagram of the drive unit of the synchronous motor in Embodiment 2 of the present invention.

FIG. 7 is a block diagram of the drive unit of the synchronous motor 1 in Embodiment 2 of the present invention. Parts which are the same as in Embodiment 1 or corresponding parts bear identical reference numerals and descriptions of these parts are omitted.

The drive unit of Embodiment 2 is such that a 3-phase/dq conversion part 16 is added to Embodiment 1. The 3-phase/dq conversion part 16 has the function of calculating the d-axis armature voltage $V_d$ and the q-axis armature voltage $V_q$ on the basis of input voltages $V_u$, $V_v$, and $V_w$ of each phase of the synchronous motor 1 and the position $\theta_r$.

The magnetic flux operation error correcting part 8 of this embodiment calculates the phase difference $\alpha$ between an input voltage to the synchronous motor 1 and an input current to the synchronous motor 1 on the basis of the d-axis armature voltage $V_d$, the q-axis armature voltage $V_q$, the d-axis armature current $I_d$, and the q-axis armature current $I_q$. The phase difference $\alpha$ is given by Expression (14) below.

[Expression 14]

$$\alpha = \tan^{-1}\left(\frac{V_q}{V_d}\right) - \tan^{-1}\left(\frac{I_q}{I_d}\right) \quad (14)$$

According to Embodiment 2 described above, the input voltage and input current used in calculating the phase difference $\alpha$ are feedback values of actual values. For this reason, it is possible to more accurately calculate the phase difference $\alpha$ than in Embodiment 1. As a result of this, it is possible to more accurately correct the inner-phase difference angle.

INDUSTRIAL APPLICABILITY

As described above, the drive unit of the synchronous motor of the present invention can be used in improving the accuracy of magnetic flux operations of the synchronous motor.

DESCRIPTION OF SYMBOLS

1 synchronous motor, 2 power converter for armature, 3 power converter for field system, 4 speed detector, 5 field weakening control part, 6 3-phase/dq conversion part, 7 magnetic flux operation part, 8 magnetic flux operation error correcting part, 9 speed control part, 10 MT/dq conversion part, 11 dq-axis current control part, 12 dq/3-phase conversion part, 13 PWM control part, 14 field current reference operation part, 15 field current control part, 16 3-phase/dq conversion part.

The invention claimed is:

1. A drive unit of a synchronous motor comprising:
a magnetic flux operation circuitry configured to, in the case where a direction of a magnetic field pole of the synchronous motor is regarded as a d-axis and a direction orthogonal to the d-axis is regarded as a q-axis, calculate a magnetic flux of the d-axis and a magnetic flux of the q-axis on the basis of a current of the d-axis, a current of the q-axis, and a field current of the synchronous motor; and
a magnetic flux operation error correcting circuitry configured to
calculate a phase difference between a voltage and a current of the synchronous motor being inputted into the magnetic flux operation error correcting circuitry;
calculate an inner-phase difference angle from the magnetic flux of the d-axis and the magnetic flux of the q-axis, wherein the inner-phase difference angle=$\tan^{-1} X$, where X=(the magnetic flux of the q-axis)/(the magnetic flux of the d-axis); and
correct the inner-phase difference angle on the basis of the phase difference, wherein
the drive unit is configured to drive the synchronous motor with the corrected inner-phase difference angle, and
the magnetic flux operation error correcting circuitry calculates a corrected magnetic flux of the q-axis on the basis of the magnetic flux of the d-axis, the magnetic flux of the q-axis, and the corrected inner-phase difference angle, wherein the corrected magnetic flux of the q-axis=$\sqrt{A} \cdot \sin B$, where A=(the magnetic flux of the d-axis)$^2$+(the magnetic flux of the q-axis)$^2$, and B=the corrected inner-phase difference angle.

2. The drive unit of the synchronous motor according to claim 1, wherein the magnetic flux operation error correcting circuitry calculates the phase difference on the basis of a voltage reference and a current detection value of the synchronous motor being inputted into the magnetic flux operation error correcting circuitry.

3. The drive unit of the synchronous motor according to claim 1, wherein the magnetic flux operation error correcting circuitry calculates the phase difference on the basis of a voltage detection value and a current detection value of the synchronous motor being inputted into the magnetic flux operation error correcting circuitry.

* * * * *